United States Patent

[11] 3,601,197

| [72] | Inventors | Robert C. Ayers, Jr.; Bert B. Williams, both of Houston, Tex. |
|---|---|---|
| [21] | Appl. No. | 33,057 |
| [22] | Filed | Apr. 29, 1970 |
| [45] | Patented | Aug. 24, 1971 |
| [73] | Assignee | Esso Production Research Company Continuation-in-part of application Ser. No. 812,349, Apr. 1, 1969, now abandoned. |

[54] TREATMENT OF FORMATIONS WITH ARYL SULFONIC ACID
18 Claims, No Drawings

[52] U.S. Cl. .................................................. 166/307,
252/8.55 C
[51] Int. Cl. ...................................................... E21b 43/27
[50] Field of Search ............................................. 166/259,
271, 305 R, 307; 252/8.55 C, 8.55 D

[56] References Cited
UNITED STATES PATENTS

| 2,024,718 | 12/1935 | Chamberlain ................ | 252/8.55 C |
| 2,059,459 | 11/1936 | Hund et al. ................... | 166/307 X |
| 2,204,580 | 6/1940 | DeGroote ..................... | 252/8.55 C |
| 2,267,548 | 12/1941 | Berl .............................. | 252/8.55 C X |
| 2,320,673 | 6/1943 | Stewart ........................ | 252/8.55 C |
| 2,338,282 | 1/1944 | Flett .............................. | 252/8.55 C |
| 2,370,421 | 2/1945 | Reed ............................. | 252/8.55 C |
| 3,353,603 | 11/1967 | Knight .......................... | 166/307 |

Primary Examiner—Ian A. Calvert
Attorneys—James A. Reilly, John B. Davidson, Lewis H. Eatherton, James E. Gilchrist, Robert L. Graham and James E. Reed ABSTRACT: A method for improving the permeability of a subterranean formation surrounding a wellbore wherein an aqueous solution containing an aryl sulfonic acid, such as p-toluem sulfonic acid, as the principal active constituent is injected into the formation to dissolve carbonates and similar materials. The solution may contain an organic polar compound or a minor amount of an inorganic acid.

TREATMENT OF FORMATIONS WITH ARYL SULFONIC ACID

CROSS-REFERENCE TO RELATED APPLICATIONS

This application is a continuation-in-part of Ser. No. 812,349, filed in the U.S. Pat. Office on Apr. 1, 1969 now abandoned.

BACKGROUND OF THE INVENTION

1. Field of the Invention

This invention relates to the acid treatment of subterranean formations surrounding oil wells, gas wells, and similar boreholes.

2. Description of the Prior Art

Acids have been widely used for improving the permeabilities of subterranean formations surrounding oil wells, gas wells, and similar boreholes. Experience has shown that conventional methods using hydrochloric acid are often unsuccessful because of the rapid reaction of the acid with calcium carbonate, magnesium carbonate, and similar materials. The rate at which the acid is neutralized often exceeds the rate at which it can be forced into the formation and hence acid solution contacting the rock at points more than a few inches from the wellbore is essentially spent. The use of chemically retarded acids and solutions of weak organic acids that have low dissociation constants and therefore react more slowly than hydrochloric acid gives somewhat better results than have generally been obtained with the older methods. Despite this, the acid penetration is often quite limited. As a result, fracturing and other more expensive stimulation methods have largely replaced acid treating in many areas.

SUMMARY OF THE INVENTION

This invention provides an improved method for the acid treatment of subterranean formations containing carbonates and similar materials susceptible to acid attack that permits significantly greater penetration of live acid into the formation than has generally been obtained in the past. In accordance with the invention, it has now been found that certain aryl sulfonic acids, although they have high dissociation constants, react very slowly with carbonates ans related materials present in subterranean formations. This slow reaction rate, coupled with the fact that such reactions normally go to completion, permits the penetration of unreacted acid into sections of the formation not normally contacted by live acid during conventional acid treating operations and makes possible substantial improvements in permeability at considerable distances from the wellbore. Increased production or injection rates can often be obtained in formations that do not normally respond to conventional acid treating.

The reasons for the improved results obtained in accordance with the invention are not fully understood. Laboratory studies indicate that several mechanisms may be involved but that molecular association of the aryl sulfonic acids probably plays a major role. The sulfonic acid molecules apparently combine in aqueous solutions to produce complex groups which result in greatly reduced ion mobilities. The rate of diffusion of hydrogen ions to the rock surfaces is relatively slow and hence much of the acid injected remains unreacted for long periods of time. This permits the movement of live acid through regions adjacent the wellbore into sections of the formation not normally reached during acid treating operations. The ultimate reaction of this acid with mineral constituents of the formation produces improvements in matrix permeability that are difficult to obtain by any other means. Other phenomena may also be involved.

DESCRIPTION OF THE PREFERRED EMBODIMENTS

The sulfonic acids employed for purposes of this invention are water-soluble organic compounds having the general formula $R_xC_6H_z(SO_3H)_y$, where R is an alkyl group containing from 1 to 2 carbon atoms, $x$ is from 0 to 3, $y$ is 1 to 2, and $z = 6-(x+y)$. Examples of such acids include benzene sulfonic acid, m-benzenedisulfonic acid, o-toluene sulfonic acid, m-toluene sulfonic acid, p-toluene sulfonic acid, ethylbenzene sulfonic acid, o-xylene sulfonic acid, m-xylene sulfonic acid, p-xylene sulfonic acid, diethylbenzene sulfonic acid, triethylbenzene sulfonic acid, and the like. These acids are usually prepared by the direct sulfonation of narrow boiling range petroleum fractions or mixed hydrocarbon isomers with fuming sulfuric acid and hence the product acids will generally consist of a mixture of isomers. Acid mixtures prepared by the blending of two or more sulfonic acids or by the simultaneous sulfonation of two or more hydrocarbon streams can also be used. The toluene sulfonic acids are preferred for purposes of the invention. Para-toluene sulfonic acid is particularly effective.

Aqueous solutions of the sulfonic acids are normally used in carrying out the invention. The concentration in which the acid is employed in solution will generally depend in part upon the particular sulfonic acid selected and the temperature of the formation to be treated. Acid concentrations in excess of about 15 percent by weight are normally used. The reaction rate obtained decreases with increasing acid concentration and increases with temperature. Concentrations greater than about 35 percent by weight are generally preferred and concentrations in excess of about 50 percent by weight are most effective in relatively deep formations where high temperatures may tend to promote relatively rapid reaction rates. The solutions may contain, in addition to the sulfonic acid, additives such as corrosion inhibitors, demulsifiers, surface tension reducing agents, chemical retarding agents, clay stabilizers, and the like. A variety of different additive agents designed to improve acid performance during well treating operations have been suggested in the prior art and may be employed if desired.

Aqueous solutions of the sulfonic acids which contain dissolved polar compounds are particularly effective for purposes of the invention. The polar compounds apparently increase the molecular association of the sulfonic acids and thus further reduce the reaction rate. Organic polar compounds that may be used include low molecular weight alcohols such as methanol, ethanol, isopropanol, n-butanol, isobutanol, and n-hexanol; carboxylic acids such as propionic acid and butyric acid; aldehydes such as propionaldehyde and butyraldehyde; ketones such as ethyl ketone; amines such as butylamine and ethylene diamine, amides such as formamide and acetamide; glycols such as ethylene such as ethylene glycol, propylene glycol, and diethylene glyclol; and the like. A minor amount of an inorganic acid such as hydrochloric acid or nitric acid can be used in lieu of an organic polar compound to promote molecular association and provide additional hydrogen ions if desired. Studies have shown that the presence of such compounds greatly retards the sulfonic acid reaction rates and that in some cases rates as low as one five-hundreth of the reaction rate of hydrochloric acid can be obtained. Such compounds are therefore particularly useful in deep, high-temperature wells where acid penetration over long distances may be particularly difficult to obtain. The compounds added to promote molecular association will normally be incorporated in the aqueous sulfonic acid solutions in concentrations substantially below the sulfonic acid concentration, generally between about 1 percent and about 50 percent, based on the total weight of the solution. Concentrations between about 5 percent and about 25 percent are normally preferred.

The polar compounds selected should be compounds which are compatible with the sulfonic acids under the conditions existing in the formation to be treated. It may therefore be advisable in certain cases to test the particular sulfonic acid and polar compound selected under conditions simulating those in the formation before the materials are employed in the field. By measuring the acid reaction rate and the total volume of carbonate or other rock dissolved by a known quantity of acid in the presence of the polar compound, the compatibility can readily be determined.

In lieu of incorporating a polar compound in the sulfonic acid solution as described above, it is sometimes advantageous to precede the acid solution with an aqueous preflush containing an ethylene glycol ether, an alcohol or a similar material which will retard the acid reaction rate. The quantity of preflush solution used will generally range between about one-tenth and about 5 volumes per volume of acid solution. The use of equal volumes of preflush and acid solution is normally preferred.

The quantity of sulfonic acid employed in carrying out the invention will depend in part upon the particular type of formation to be treated. The sulfonic acids are particularly useful in limestones, dolomites, and similar carbonate formations but can also be used in serpentines and other siliceous formations containing interstitial clays or cementing materials with high carbonate contents. In formations of this latter type, lesser quantities of sulfonic acid than might be required in a limestone or dolomite can often be used. This is particularly true where the sulfonic acid is used as a preflush prior to the injection of the hydrofluoric acid, a mixture of hydrofluoric and hydrochloric acids, or a mixture of hydrofluoric acid and an organic acid such as formic acid or acetic acid. The use of such a preflush will often permit greater stimulation of a siliceous formation than can be obtained with hydrofluoric acid or a mud acid alone.

The amount of acid injected is also dependent on the thickness of the formation to be treated and the depth of penetration desired. The greater the thickness and desired penetration, the greater the quantity of acid that will be required. In general, the quantities used will range between about 5 and about 1000 gallons of acid solution per foot of formation thickness. Quantities near the lower end of this range are often adequate for overcoming formation damage near the wellbore. Much greater quantities may be needed to improve permeability at more remote points. The use of from about 25 to about 200 gallons per foot usually produces satisfactory results and is normally preferred.

The procedures used to prepare the well in which the method of the invention is to be carried out will depend in part upon the type of well to be treated. In a pumping oil well, for example, it is normally preferred to unseat the packer and inject brine to displace fluid standing in the wellbore. The sucker rods, pump, and associated equipment can then be removed from the well. Accumulated wax and other foreign material present in the perforations or adhering to the face of the producing interval can be removed by running a scratcher or a similar device within the producing zone. A string of tubing provided with a packer can then be lowered into the wellbore to a point above the zone to be treated and the well can be filled with crude oil, diesel oil, or brine. In flowing oil wells and wells used for the injection of water or gas into a formation, the acidizing fluids can generally be pumped directly into the formation through the tubing string without unseating the packer. Similarly, producing gas wells generally require little or no preparation. Since the tubing in such a well is generally filled with gas and no pumping equipment is present, the well can be killed by simply injecting brine, crude oil or diesel oil through the tubing string. The preparation steps employed may thus be similar to those used in conventional acid treating operations and will therefore be familiar to those skilled in the art.

Following preparation of the well, the method of the invention is normally carried out by injecting the aryl sulfonic acid solution into the producing formation surrounding the wellbore. As pointed out earlier, a preflush can be used if desired. It is generally preferred that the injection pressure be kept below that necessary to fracture the formation so that reasonably uniform penetration of the acid into the formation matrix occurs. The injection rate selected should in most cases be sufficient to keep the pressure just below that necessary to fracture the formation. To achieve maximum penetration of the acid, the rate should generally be increased as the matrix permeability increases due to acid attack. It is usually advisable to size the tubing so that turbulent flow is obtained and mixing of the acid solution with liquids preceding or following the solution is thereby minimized. Alternatively, wiper plugs can be used.

If the interval being treated with the sulfonic acid is more than about 5 feet in thickness or if more than five perforations are open to the wellbore, it may be advisable in some cases to include in the acid solution or dispersion a powdered diverting agent which will promote balanced acid invasion of the entire zone. A variety of different diverting agents are available commercially. Commercial cyclopentadiene resins and similar oil-soluble, water-insoluble polymers are often used in aqueous acid solutions. Such materials may be employed in concentrations ranging from about 0.5 pounds per perforation up to about 5 pounds per perforation, depending upon the permeability of the formation.

Following injection of the sulfonic acid solution into the formation, it is generally preferred to inject an aqueous afterflush, particularly if the formation is one having a relatively low connate water saturation. This afterflush tends to displace the acid solution into the formation away from the wellbore and thus promote greater penetration for a given volume of acid injected. It also serves to solubilize any sulfonate reaction products that may be present in some portions of the formation in quantities exceeding the solubility limit and which may therefore tend to cause some localized plugging of pores in the formation. From about one-tenth to about 10 volumes of afterflush per volume of acid solution will normally be employed. It is preferred to use from about one-half to about 5 volumes per volume of acid solution.

The acid solution may also be used with an oil afterflush if desired. Diesel oil or a similar petroleum fraction, alone or in combination with an organic solvent which is at least partially miscible with oil and water or brine under the conditions existing within the formation, often produces beneficial results. Suitable solvents include the low molecular weight alcohols such as methanol, ethanol, propanol, isopropanol, and tertiary butanol; aldehydes such as formaldehyde and acetaldehyde; ketones such as acetone; glycol ethers such as ethylene glycol monomethyl ether, ethylene glycol monoethyl ether, ethylene glycol dimethyl ether, ethylene glycol monobutyl ether, and ethylene glycol diethyl ether; and the like. It is generally preferred that these solvents be added to the hydrocarbon oil in a concentration of from about 5 percent to about 20 percent by volume. From about one-tenth to about 10 volumes of afterflush per volume of acid solution is normally used. Again, the preferred quantity is from about one-half to about 5 volumes per volume of acid solution.

In lieu of using the acids at matrix rates as described above, the sulfonic acids may be injected, with or without propping agents, at rates sufficient to fracture the formation. The low effective reaction rates of these acids, apparently due to a reduction in mass transport properties, results in greatly increased penetration of live acid along the fracture and thus permits greater improvements in permeability than can otherwise be obtained. The injection of gelled water or a crude oil or petroleum fraction having a viscosity sufficiently greater than that of the acid solution to facilitate the generation of a fracture in the formation and the subsequent injection of the acid solution is particularly beneficial. The low viscosity acid solution tends to finger through the more viscous gelled water or oil in the fracture and thus penetrates deeply into the formation before it begins to react with the formation rock in substantial quantities. Although some reaction takes place on the fracture walls near the wellbore, most of the injected acid solution is confined by the more viscous fluid until it reaches points near the end of the fracture. This permits the development of increased permeability at great distances from the wellbore and often results in substantially greater stimulation than can be obtained by other methods.

After the fluid containing the sulfonic acid has been injected into the formation, alone or in combination with a suitable afterflush, normal operations may be resumed as soon as practicable. If the treated well is a production well, it is often preferred to let the injected fluids stand in the formation overnight before backflowing the well and resuming the production of formation fluids. This is not essential, however, and in some cases production can be resumed immediately. If the well is an injection well, backflowing of the injected fluids can often be dispensed with. By resuming the injection of water, gas or other fluid after the acid solution has been introduced into the formation, the treating agents and acid reaction products can be pumped into areas of the formation where they will have essentially no effect on either the injection well or associated production wells and hence backflowing is unnecessary.

The nature and objects of the invention are further illustrated by the results of test carried out with the sulfonic acids and with conventional hydrochloric acid solutions. In the first of a series of such tests, the rates at which 3.6 percent hydrochloric acid and various solutions of $p$-toluene sulfonic acid and xylene sulfonic acid dissolved limestone were measured. These tests were carried out at room temperature. The results obtained are set forth in Table I below.

TABLE I

LIMESTONE DISSOLUTION RATES

| Acid Solution | Dissolution Rate, grams/min. | Acid Solution | Dissolution Rate, grams/min. |
|---|---|---|---|
| 3.6% HCl | 0.055 | 4.5% xylene sulfonic acid | 0.00058 |
| 3.8% $p$-toluene sulfonic acid | 0.0285 | | |
| 60% $p$-toluene sulfonic acid | 0.0012 | | |

It will be noted from the above table that the dissolution rates in the sulfonic acid were much lower than that in the dilute hydrochloric acid solution. If commercial 15 percent hydrochloric acid sold for acidizing operations had been used, the differences would have been even more striking. It will also be noted that the reaction rate with the $p$-toluene sulfonic acid decreased markedly as the concentration was increased from 38 percent to 60 percent. The rate with the 60 percent solution was only about one-twentieth that obtained with the less concentrated solution. By selecting the proper concentration, a range in reaction rates can thus be obtained. This range can be broadened substantially by adding a polar compound to the acid solution. The slow reaction rates thus obtained provide an effective means for securing the penetration of live acid over great distances.

A second series of tests were carried out with $p$-toluene sulfonic acid solutions of various concentrations to determine the extent of reaction of the acids. Each acid sample was contacted with an excess of calcium carbonate at a temperature of 75° F. and a pressure of 1000 pounds per square inch and, after the reaction had ceased, the final acid concentration was determined by titration. The results obtained were as follows:

TABLE II

EQUILIBRIUM REACTION DATA

| Sample | Initial Acid Concentration, wt. % | Final Acid Concentration, wt. % |
|---|---|---|
| A | 40 | 0.17 |
| B | 50 | 0.34 |
| C | 60 | 0.16 |
| D | 80 | 0.32 |

The above results demonstrate that the sulfonic acid—calcium carbonate reaction goes essentially to completion and the acid will therefore be spent in the formation. The acid will continue to react with the carbonate rock as it moves through the formation at points remote from the wellbore and hence significantly greater permeability increases than might otherwise be realized can be obtained.

In a third series of tests, the solubility of calcium $p$-toluene sulfonate was measured in distilled water and 60 percent $p$-toluene sulfonic acid at various temperatures. The results of these measurements are set forth below:

TABLE III

SOLUBILITY OF CALCIUM $p$-TOLUENE SULFONATE

| Distilled Water | | 60% $p$-Toluene Sulfonic Acid | |
|---|---|---|---|
| Temperature, °F. | Solubility, wt. % | Temperature, °F. | Solubility, wt. % |
| 75 | 34.1 | 75 | 2.1 |
| 165 | 50.5 | 165 | 6.7 |
| 180 | 51.6 | 220 | 6.5 |
| 220 | 50.5 | | |

The solubility data reported above show that the calcium salts of $p$-toluene sulfonic acid are quite soluble in water and moderately soluble in the 60 percent acid. As a result, plugging of the formation pore spaces by the acid reaction products presents little difficulty, particularly if the formation contains connate water in appreciable quantities or an aqueous afterflush is used.

One of the advantages of the aryl sulfonic acids is that they are relatively noncorrosive, despite their effectiveness in dissolving carbonates and similar constituents of subterranean formations. Corrosion rates with various metals are as follows:

TABLE IV

CORROSION RATES—94% $p$-TOLUENE SULFONIC ACID

| Material | Corrosion Rate, inches/year | |
|---|---|---|
| | 50° C. | 70° C. |
| Carbon Steel | 0.0008 | 0.0021 |
| Aluminum | 0.0099 | 0.0579 |
| 304 Stainless Steel | 0.0000 | 0.0000 |

The corrosion rates for lower acid concentrations are somewhat higher than those for the 94 percent acid reported above but are not sufficiently high to result in serious damage to tubing, casing, and other equipment.

Further tests which demonstrate the advantages of the sulfonic acids over hydrochloric acid were carried out by flooding limestone cores with HCl and with $p$-toluene sulfonic acid at various temperatures and at both high and low flow rates. The initial tests were conducted in cores saturated with water and later tests were then run in similar cores containing a 3 percent sodium chloride brine and diesel oil. The results of these core tests are shown in Table V:

TABLE V.—RESULTS OF CORE FLOODS WITH p-TOLUENE SULFONIC ACID

| Temp., °F. | Acid | Acid velocity, in./sec. | Pore volumes of acid | Core saturated with— | Results |
|---|---|---|---|---|---|
| 200 | 15% HCl | 0.0137 | 3.5 | Water | Wormhole from 4–6 inches long. |
| 200 | 15% pTSA* | 0.137 | 6.9 | do | Wormhole from 12–15 inches long. |
| 200 | 60% pTSA | 0.137 | 1.2 | do | Wormhole through 18 inch core. |
| 200 | 60% pTSA | 0.0137 | 1.8 | do | Do. |
| 200 | 60% pTSA | 0.137 | 0.5 | 3% NaCl brine diesel oil | Do. |
| 150 | 40% pTSA | 0.137 | 1.3 | do | Do. |
| 150 | 60% pTSA | 0.137 | 0.5 | do | Do. |
| 75 | 15% pTSA | 0.137 | 2.5 | do | Do. |
| 75 | 30% pTSA | 0.137 | 0.5 | do | Do. |
| 75 | 60% pTSA | 0.137 | 1.5 | do | Very little reaction, core plugged. |

*p-Toluene sulfonic acid.

It can be seen from the data in Table V that the 15 percent hydrochloric acid solution gave the typical "wormhole" normally obtained with strong acids and that the acid reacted so rapidly that it was essentially spent after a wormhole from 4 to 6 inches long has been formed. This behavior is typical of hydrochloric acid and indicates that the effect of acid treating with HCl solutions is normally limited to a narrow band of the formation in the immediate vicinity of the wellbore. Such treatment is often effective in overcoming formation damage next to the wellbore but has little or no beneficial effect at points more than a few inches away from the wellbore. The results obtained with the p-toluene sulfonic acid were similar to those obtained with strong acids in that wormholes were formed but differed from the results with hydrochloric acid in that much greater penetration was obtained. The wormholes extended completely through the 18-inch cores except where 15 percent acid was used at 200° F. and where 60 percent acid was used at 75° F. The reaction rate of the 15 percent p-toluene sulfonic acid, although considerably lower than that for 15 percent HCl, is relatively high at 200° F. and hence the penetration obtained was lower than that with the more concentrated p-toluene sulfonic acid solutions. It is for this reason that acid solutions having concentrations in excess of about 15 percent are generally preferred for use in formations where temperatures may be relatively high. Similarly, the reaction rate of the 60 percent p-toluene sulfonic acid at 75° F. was quite low and hence very little reaction was obtained. The plugging of the core may have been due to the formation of the calcium p-toluene sulfonate. At higher temperatures and in less concentrated acid solutions the solubility of this salt is much higher and hence such plugging does not occur. These results demonstrate the benefits of selecting the acid concentration to be used on the basis of the temperature of the formation in which the acid solution is to be used.

In assessing the date of Table V, it should be noted that in some cases a wormhole extending completely through the 18-inch core was obtained even through only one-half pore volume of acid was used. This indicates that the sulfonic acid solutions are quite effective and that in many cases it will be possible to obtain substantial improvements in permeability at points remote from the wellbore with relatively small volumes of acid.

We claim:

1. A method for improving the permeability of a subterranean formation surrounding a wellbore which comprises injecting into said formation an aqueous solution consisting essentially of water and organic water-soluble aryl sulfonic acid having the general formula $R_xC_6H_z(SO_3H)_y$, where R is an alkyl group containing from 1 to 2 carbon atoms, x is from 0 to 3, y is from 1 to 2, and $z=6-(x+y)$.

2. A method as defined by claim 1 wherein said sulfonic acid is p-toluene sulfonic acid.

3. A method as defined by claim 1 wherein said aqueous solution is followed by an aqueous afterflush.

4. A method as defined by claim 1 wherein said aqueous solution is preceded by an aqueous preflush.

5. A method as defined by claim 1 wherein said sulfonic acid is present in said aqueous solution in a concentration in excess of about 35 percent by weight.

6. A method as defined by claim 1 wherein said aqueous solution is injected in a quantity between about 25 and about 200 gallons per foot of formation thickness.

7. A method for treating a subterranean formation surrounding a wellbore which comprises injecting into said formation an aqueous acidizing solution consisting essentially of an organic, water-soluble aryl sulfonic acid, water, and a polar organic compound, said sulfonic acid being present in a concentration in excess of about 15 percent by weight and having the general formula $R_xC_6H_z(SO_3H)_y$, where R is an alkyl group containing from 1 to 2 carbon atoms, x is from 0 to 3, y is from 1 to 2, and $z=6-(x+y)$.

8. A method as defined by claim 7 wherein said polar organic compound is a carboxylic acid.

9. A method as defined by claim 7 wherein said polar organic compound is an alcohol.

10. A method as defined by claim 7 wherein said polar organic compound is present in said acidizing solution in a concentration between about 1 percent and about 50 percent by weight.

11. A method as defined by claim 7 wherein said sulfonic acid is p-toluene sulfonic acid.

12. A method as defined by claim 7 wherein said sulfonic acid is present in said acidizing solution in a concentration in excess of about 50 percent by weight.

13. A method for acidizing a subterranean formation surrounding a wellbore which comprises injecting into said formation and aqueous acidizing solution consisting essentially of an organic, water-soluble aryl sulfonic acid, a minor amount of an inorganic acid, and water, said sulfonic acid being present in a concentration in excess of about 15 percent by weight and having the general formula $R_xC_6H_z(SO_3H)_y$, where R is an alkyl group containing from 1 to 2 carbon atoms, x is from 0 to 3, y is from 1 to 2, and $z=6-(x+y)$.

14. A method as defined by claim 13 wherein said sulfonic acid is p-toluene sulfonic acid and said inorganic acid is hydrochloric acid.

15. A method for treating a subterranean carbonate-containing formation surrounding a wellbore which comprises injecting into said formation an aqueous acid solution consisting essentially of an organic, water-soluble aryl sulfonic acid and water, introducing an aqueous afterflush into said formation behind said acid solution, and thereafter producing fluids from said formation into the wellbore, said sulfonic acid having the general formula $R_xC_6H_z(SO_3H)_y$, where R is an alkyl group containing from 1 to 2 carbon atoms, x is from 0 to 3, y is from 1 to 2, and $z=6-(x+y)$.

16. A method as defined by claim 15 wherein said sulfonic acid is p-toluene sulfonic acid and said acid is present in said solution in a concentration in excess of about 35 percent by weight.

17. A method as defined by claim 15 wherein said acid solution has an acid concentration in excess of about 50 percent by weight.

18. A method for treating a subterranean formation surrounding a wellbore which comprises injecting an aqueous solution consisting essentially of toluene sulfonic acid and water into said formation, said toluene sulfonic acid being present in said solution in a concentration in excess of about 35 percent by weight.